3,639,585
METHOD OF PREVENTING CORTICOSTEROID-INDUCED ADVERSE EFFECTS ON BONE AND COMPOSITIONS USEFUL IN SAID METHOD
Robert H. Hesse, Winchester, Mass., assignor to Research Institute for Medicine and Chemistry, Cambridge, Mass.
No Drawing. Filed Mar. 29, 1968, Ser. No. 717,408
Int. Cl. A61k *17/00, 17/16*
U.S. Cl. 424—128                                        10 Claims

ABSTRACT OF THE DISCLOSURE

A method of preventing the adverse effect on bone metabolism usually encountered with corticosteroid therapy comprises administering to an animal being treated with a corticosteroid, substantially simultaneously with said corticosteroid, a non-toxic, assimilable, phosphorus-containing substance, preferably neutral phosphate.

Described are pharmaceutical formulations useful in the prevention of corticosteroid-induced adverse effects on bone.

BACKGROUND OF INVENTION

Field of invention

The present invention relates to an improvement in the method of treating diseases requiring corticosteroid therapy and to therapeutic compositions for use in such treatment.

More specifically, this invention relates to a method of preventing the adverse effects on bone metabolism usually encountered with chorticosteroid therapy which comprises administering to an animal being treated with a corticosteroid, substantially simultaneously with said corticosteroid, a non-toxic, assimilable, phosphorus-containing substance (preferably neutral phosphate) in an amount sufficient to provide a daily dose of assimilable, phosphorus-containing substance (preferably neutral phosphate) equivalent to at least 1.4 mgm. inorganic phosphorus per kilogram body weight of said animal and up to approximately 71.5 mgms. inorganic phosphorus per kilogram body weight of said animal.

This invention also relates to compositions comprising corticosteroid and assimilable phosphate useful in said method of preventing corticosteroid-induced adverse effects on bone.

As used in this specification (unless otherwise specified) the term "neutral phosphate" is defined as a mixture of four parts by weight of disodium hydrogen phosphate and 1.14 parts by weight of potassium dihydrogen phosphate.

Well known are the advantageous anti-inflammatory therapeutic effects of corticosteroids including corticosteroids such as hydrocortisone, prednisone, prednisolone, triamcinolone, dexamethasone, betamethasone, paramethasone, and the like. A convenient measure of the anti-inflammatory effect of corticosteroids such as the foregoing is the loss of nitrogen from the body (i.e. negative nitrogen balance) upon administration of a corticosteroid since it has been established by complete metabolic studies in human subjects that the anti-inflammatory effect of corticosteroids is associated in a quantitative fashion with the loss of nitrogen from the body.

Also well known are the adverse side effects associated with corticosteroid therapy. It has been known, for example, that one of the most severe side effects in the use of corticosteroids results from the adverse action of corticosteroids on bone, with the consequent induction of changes of bone metabolism and function resulting in corticosteroid-induced osteoporosis. These changes are clearly evident upon radiological and histological examination of bone, and are also reflected by indirect parameters such as an increased excretion of calcium from the body (known as a negative calcium balance) and an increased hydroxyproline excretion (a parameter of bone metabolism associated with bone resorption) as established by complete metabolic balance studies. To date, all available anti-inflammatory corticosteroids possess this and other side effects in varying degrees. No significant separation between desirable therapeutic effects and undesirable side effects on the bone has been obtained with any of the numerous chemical modifications of the basic corticosteroids structure.

The mechanism whereby osteoporosis is induced by the administration of anti-inflammatory corticosteroids is unknown. Although numerous investigations have been conducted and the results recorded there is no unanimity concerning the basic mechanism. Some investigations indicate that the anti-inflammatory steroids inhibit bone formation, other studies indicate these steroids stimulate bone resorption, and still other studies indicate these steroids induce a combination of inhibition of bone formation and enhanced bone resorption. Irrespective of the mechanism of action there is no doubt that anti-inflammatory steroids induce changes in bone metabolism resulting in loss in bone mass leading to osteoporosis; and that these adverse changes can be directly measured by techniques such as radiological and histological examination of the bone itself, or assessed indirectly by a measurement of the calcium loss from the body and the increase in hydroxyproline excretion normally engendered by corticosteroid therapy.

The present invention now provides a method of preventing the undesirable effects of corticosteroids on bone metabolism and, to be more specific, provides a method of preventing corticosteroid-induced osteoporosis. I have discovered that it is now possible by the substantially simultaneous administration of a non-toxic, assimilable, phosphorus-containing substance (preferably neutral phosphate administered orally) with a corticosteroid, to substantially prevent the adverse effects on bone metabolism associated with administration of corticosteroids without altering to a significant extent the nitrogen loss and anti-inflammatory response. The prevention of corticosteroid-induced osteoporosis is of extreme importance in view of the fact that all direct (radiological and histological) evidence to date indicates that corticosteroid-induced osteoporosis, once established, cannot be reversed. All attempts to effect remineralization of bones damaged by corticosteroid administration have been ineffective.

The advantageous effect of administering a phosphorus-containing substance (e.g. neutral phosphate) with a corticosteroid on bone metabolism and bone function is evident on direct examination of the bone via radiological and histological techniques, and is also evident by the measurement of secondary parameters, e.g. the prevention of calcium loss from the body.

Known in the art of medicine is the administration of phosphorus-containing substances. For example, neutral phosphate has been used in medicine in the treatment of hypercalcemia (excess calcium in the blood serum) of various etiologies such as hyperparathyroidism, carcinomas and others. However, its possible use in the prevention of osteoporosis is unknown and, indeed, would not be expected in view of prior art teaching that the effectiveness of phosphate therapy on hypercalcemia is due to an interference with parathyroid hormone secretion and action. Thus, it was originally postulated (Fuller et al., Harvey Lecture Series 38, 123–186 (1942–1943)) that the loss of nitrogen and calcium engendered by cortical hormones (i.e. corticosteroids) represented an antianabolic effect of the cortical hormones (i.e. corticoids) and (it was further postulated) that the decreased formation of osteoid tissue (resulting from this anti-anabolic effect) deprived the bone of a matrix for the deposition of calcium, the net effect being a negative calcium balance. Albright et al., J. Clin. Invest. 11, 411 (1932) demonstrated that the elevated blood calcium levels associated with hyperparathyroidism as well as with hypercalcemia resulting from cancer of diverse origins (since here too parathyroid hormone is elevated) can be lowered by phosphate infusion, and he attributed this lowering of the blood calcium level to be the result of the phosphate suppressing parathyroid hormone secretion. This theory gained wide acceptance and is held today by some leading figures in bone metabolism.

In view of the effect of phosphate of lowering calcium in the blood, and in view of the fact that corticosteroids, which are known to induce osteroporosis, have been used to lower serum calcium in the treatment of hypercalcemia, one would expect that the combination of corticosteroid with a phosphate-containing substance would increase the adverse effect on bone metabolism and thus increase the rate and degree of corticosteroid-induced osteoporosis.

I have found, however, that the substantially simultaneous administration of corticosteroids with neutral phosphate does not increase the degree or rate of corticosteroid-induced osteoporosis as one might anticipate but, rather, prevents corticosteroid-induced osteoporosis.

My invention is supported by metabolic studies in man and metabolic and histological studies of bone in lower animals.

My studies include metabolic balance techniques in which balances of calcium, phosphorus, nitrogen, magnesium, sodium, and chloride are determined along with determinations of hydroxyproline excretion and tracer studies using radioactive bone seeking substances. In addition to these indirect parameters which might reflect changes other than those caused by changes in bone metabolism and structure, my invention is supported by direct measurements on osseous tissues including radiography and histolologic examinations of osseous tissues and soft tissues. While I do not wish to be bound by theoretical considerations, these studies are most reasonably accommodated by postulating a direct stimulation of bone metabolism by the administration of a phosphorus-containing substance, particularly neutral phosphate. Consequently the ability of phosphorus preparations to negate the adverse effects of corticosteroids on bone metabolism is probably exerted by a stimulation of bone formation and bone mineralization. Thus, by my invention, there is now known a therapeutical agent (e.g. phosphate) which can be used in combination with anti-inflammatory corticosteroids to negate the adverse effect of the latter on bone metabolism.

SUMMARY OF THE INVENTION

The invention sought to be patented in its process aspect is described as residing in the concept of a method of preventing the adverse effect on bone metabolism, heretofore associated with the administration of anti-inflammatory corticosteroids, which comprises administering to an animal being treated with a corticosteroid, substantially simultaneously with said corticosteroid, a non-toxic, assimilable, phosphorus-containing substance in an amount sufficient to provide a daily dose of at least approximately 1.4 mgms. inorganic phosphorus per kilogram body weight of said animal and up to approximately 71.5 mgms. inorganic phosphorus per kilogram body weight of said animal.

A preferred embodiment of the process aspect of this invention is that wherein the phosphorus-containing substance is neutral phosphate administered substantially simultaneously with a corticosteroid in amounts sufficient to provide at least approximately 2.8 mgms./kg. up to approximately 71.5 mgms./kg. inorganic phosphorus per day.

A particularly preferred embodiment of my invention is that wherein neutral phosphate is administered substantially simultaneously with a corticosteroid via the oral route in doses sufficient to provide at least approximately 10.7 mg./kg. up to approximately 36 mg./kg. of inorganic phosphorus per day. Included within this preferred embodiment is the method of preventing corticosteroid-induced osteoporosis is a mammal of about 70 kilogram body weight (e.g. man) which comprises orally administering to said mammal, substantially simultaneously with said corticosteroid, neutral phosphate in amounts sufficient to provide a dose of from at least approximately 750 mgm. up to approximately 2.5 gms. of inorganic phosphorus per day.

In its pharmaceutical composition aspect, the invention sought to be patented resides in the concept of a pharmaceutical formulation comprising a therapeutically effective dose of a corticosteroid and a non-toxic, assimilable, phosphate-containing substance in an amount which will provide at least approximately 100 mgms. up to approximately 5 grams of inorganic phosphorus.

In a preferred embodiment of the pharmaceutical composition aspect of this invention, the phosphate-containing substance is neutral phosphate.

A particularly preferred embodiment of the pharmaceutical composition aspect of this invention includes oral pharmaceutical formulations for use in preventing corticosteroid-induced osteoporosis in mammals of about 70 kilogram weight (e.g. man) comprising a therapeutically effective oral dose of a corticosteriod and neutral phosphate sufficient to provide from at least approximately 750 mg. up to approximately 2.5 grams of inorganic phosphorus.

DESCRIPTION OF INVENTION

Process aspect

My invention provides an improvement in corticosteriod therapy in which the adverse effects of corticosteroids on bone are eliminated by the substantially simultaneous administration of a non-toxic, assimilable phosphorus-containing substance with said corticosteroid.

The adrenal corticosteroids employed in the present invention include those having anti-inflammatory activity and may be any of those bearing an 11-oxygen or 11-halogen atom including derivatives of corticosterone, cortisone, hydrocortisone, prednisone, or prednisolone as well as the 6-methyl-, 6-halo-, 6-hydroxy-, 16-methyl- or 16-methylene-, 16-halogeno- or 16-hydroxyderivatives of the foregoing; and the 9α-halogeno derivatives and the non-toxic 17- and/or 21-esters of all the foregoing compounds. Any other adrenal corticosteroid characterized by anti-inflammatory activity and a tendency to produce negative calcium and nitrogen balances may be employed in the present invention.

The source of phosphorus employed in the present invention may be any non-toxic, assimilable phosphorus-containing substance, including a hypophosphite or alkali metal hypophosphite such as sodium, calcium, or potassium hypophosphite; hypophosphorus acid or salt of hypophosphorus acid; a pyrophosphoric acid or a salt of a pyrophosphoric acid such as sodium pyrophosphate, potassium pyrophosphate, or calcium pyrophosphate; an organic pyrophosphate such as glucose-6-pyrophosphate, glycerol pyrophosphate; a polyphosphate such as sodium tri-polyphosphate; and preferably non-toxic, assimilable phosphate-containing substances including phosphoric acid or a salt of phosphoric acid such as sodium or potassium phosphate; an organic ester of phosphoric acid such as glucose-6-phosphate, fructose-1,6-diphosphate or glycerol phosphate, or any combination of the above.

I have found a particularly useful phosphate combination to be a neutral mixture of 4 parts by weight of disodium-hydrogen-phosphate to 1.14 parts by weight potassium-dihydrogen-phosphate (herein referred to as "neutral phosphate") since it provides a physiological ratio of sodium and potassium and a high ratio of phosphorus to bulk.

The neutral phosphate mixture defined above is a preferred source of assimilable phosphorus for use in my invention. Other neutral mixtures of disodium hydrogen phosphate and potassium dihydrogen phosphate may also be used in carrying out the process of this invention provided such mixtures supply the requirements of assimilable inorganic phosphorus specified above, i.e. daily dose of at least approximately 1.4 mg./kg. up to 71.5 mg./kg. phosphorus.

The phosphate-containing preparation is preferably administered orally together with the corticosteroid or mixture of corticosteroids. The phosphorus-containing substance (e.g. neutral phosphate) may also be administered parenterally or orally, substantially simultaneously with the oral or parenteral administration of one or more corticosteroids. The object of the present invention is not affected by the additional incorporation of other substances to overcome other side effects associated with corticosteroids. For instance, it may be advantageous to include small amounts of vitamin D; small amounts of fluoride ion; small amounts of an anabolic steroid such as testosterone propionate, or methyltestosterone; small amounts of an essential amino acid or mixture of essential amino acids; or a mixture of essential amino acids and vitamins.

It will be appreciated that the total daily dose of the preferred phosphate preparation necessary to prevent corticosteroid-induced-osteoporosis will depend largely on the dose and nature of the corticosteroid with which it is administered as well as upon the route of administration of the phosphorus preparation as well as on the size of animal receiving this therapy.

It is well known that the effective dose of corticosteroids differ. For example, in the 1968 edition of Physicians' Desk Reference to Pharmaceutical Specialties and Biologicals (published by Medical Economics, Inc.) on page 785 there appears the following comparative data of the anti-inflammatory activity of several corticosteroids:

TABLE 1.—USUAL EQUIVALENT DOSES OF SEVERAL CORTICOSTEROIDS

| | Mg. |
|---|---|
| Haldrone (paramethasone acetate) | 2 |
| Betamethasone | 0.6 |
| Dexamethasone | 0.75 |
| Fluprednisolone | 1.5 |
| 6-methylprednisolone | 4 |
| Triamcinolone | 4 |
| Prednisolone | 5 |
| Prednisone | 5 |
| Hydrocortisone | 20 |
| Cortisone | 25 |

In administering a phosphorus-containing substance (e.g. a phosphate-containing substance, preferably neutral phosphate) in my process, the ratio of inorganic phosphorus to corticosteroid administered will be proportional to the relative therapeutic index of administered steroid (to betamethasone, for example). Thus, when administering 0.6 mg. betamethasone to man, (i.e. a therapeutic doses—see Table 1) the substantially simultaneous administration of 3600 milligrams neutral phosphate (Example 1A) (equivalent to about 0.9 grams inorganic phosphorus) will prevent adverse effects on bone metabolism as evidenced by secondary measurements, particularly the absence of negative calcium balance after administration. A pharmaceutical preparation to achieve this balance would have a gram ratio of phosphorus to betamethasone of about 900 to 0.6 (i.e. 1500/1). However, when a therapeutic dose of triamcinolone is administered for prevention of corticosteroid-induced-osteoporosis, there ought be administered at least almost seven times the gram quantity of steroid (i.e. 7×0.6=4.2—see Table 1 above) as that administered with an equivalent therapeutic dose of betamethasone; whereas, the quantity of neutral phosphate necessary to prevent corticosteroid-induced-osteoporosis will remain the same (i.e. equivalent to about 900 mg. inorganic phosphorus). Thus, a pharmaceutical formulation containing triamcinolone useful in the prevention of osteoporosis will have a gram ratio of phosphorus to triamcinolone at least about 900 to 4 (i.e. 225/1).

In carrying out my process, since individual patients and indications being treated differ, as well as the activities of different corticosteroids, the exact daily dosage of phosphorus-containing substance (e.g. neutral phosphate) most advantageously administered substantially simultaneously with a given daily dose of corticosteroid may differ with different individuals. However, irrespective of the actual gram dosage of corticosteroid being administered, or of the mode of administration, or of animal size, the best results in my method of preventing corticostreoid-induced osteoporosis are obtained when the amount of phosphorus-containing substance (e.g. neutral phosphate) administered is chosen so that the daily dosage (estimated as phosphorus) is at least 2.9 mg./kg. and up to 71.5 mg./kg. When corticosteroids are administered in man at effective dose rates and the phosphate preparation is administered orally, good results are obtained with a daily dosage (estimated as phosphorus) of at least about 0.75 gms. to about 2.5 gms. In those human subjects with a tendency to osteoporosis or in cases of prolonged therapy at high doses of corticosteroid, larger daily dosages, e.g. 1.5 gms. to 5 gms. (estimated as phosphorus), of phosphate preparation are in order. If the phosphate preparation is administered intravenously, smaller daily doses (e.g. equivalent to from 0.2 to 1 gm. inorganic phosphorus) may be effective. It will be appreciated from the foregoing that simple phosphoric, pyrophosphoric, or polyphoshoric esters of corticosteroids contain insufficient phosphorus to alleviate the adverse effect on bone metabolism. Additionally, it is evident that calcium phosphate in the amounts usually found as a pharmaceutical excipient does not provide sufficient phosphorus for the purpose of this invention since calcium phosphate is known to be poorly assimilated from the gut.

The process of my invention is effectively carried out on any animal receiving corticosteroid therapy and subjected to cortocosteroid bone diseases, particularly on mammals including lower animals such as the rat, cat, rabbit and the dog, and higher animals such as cattle, horses and man. The process of my invention finds its greatest usefulness in the prevention of steroid-induced osteoporosis in man.

As disclosed hereinabove, the advantageous effects of my process when carried out on humans has been demonstrated by the results of complete metabolic studies carried out under carefully controlled conditions of subjects receiving corticosteroid therapy and neutral phosphate substantially concomitantly therewith. The results of these studies demonstrate, for example, that in humans being treated with betamethasone, when a total daily dose of at least about 3.5 grams neutral phosphate is orally administered together with even a massive oral daily dose of betamethasone (e.g. up to 4.8 mgm.) that the anti-inflammatory effectiveness of betamethasone remains high while, advantageously, the calcium balance of these patients remains normal (whereas patients *not* receiving neutral phosphate exhibit a strong negative calcium balance); and, furthermore, there is but a small rise in the excretion of hydroxyproline (as compared with a sharp rise in hydroxyproline excretion in betamethasone treated patients not receiving neutral phosphate therapy).

Additionally, in studies on intact rats (carried out as described by M. M. Pechet et al., Am. J. Medicine, 696 (November 1967), it has been demonstrated by direct observations of histological sections of the bones of the treated rats, together with metabolic balance studies, that neutral phosphate infusions stimulate bone formation and bone mineralization.

DESCRIPTION OF PHARMACEUTICAL COMPOSITION ASPECT OF THE INVENTION

A further feature of my invention provides pharmaceutical compositions useful in preventing corticosteroid-induced osteroporosis containing one or more corticosteroids together with one or more non-toxic, assimilable, phosphorus-containing substances, preferably a phosphate-containing substance of which neutral phosphate is a preferred species. These compositions may also include vitamin D, or a vitamin D active substance, essential amino acids, anabolic steroids, vitamins or fluoride ion or other substances to offset side effects associated with the corticosteroid. The compositions may be presented in a form suitable for oral, rectal, or parenteral administration. Thus, for example, compositions for oral administration may be solid or liquid and may take the form of granules, tablets, coated tablets, capsules, lozenges, syrups, emulsions, suspensions, elixirs, or drops. Such compositions may comprise carriers or excipients conventionally used in the pharmaceutical art. For parenteral administration the carrier may be a sterile, parenterally accepted liquid, such as sterile pyrogen free water, or a parenterally acceptable oil such as arackis oil contained in ampules.

The preferred pharmaceutical compositions of my invention are compositions for oral administration comprising a corticosteroid and neutral phosphate, the quantity of said neutral phosphate per therapeutically effective unit dose of corticosteroid being sufficient to provide from at least approximately 100 mg. up to approximately 5 gms. inorganic phosphorus. (One gram of neutral phosphate is equivalent to about 0.22 gram of inorganic phosphorus.)

The following are examples of compositions prepared in accordance with this invention, but it is to be understood that they are presented by way of illustration only and not as indicating the scope of the invention. The dosage form and frequence of dosage of these forms will vary according to the nature and severity of the condition being treated. In each instance these may be chosen to provide the appropriate amount of steroid for the syndrome treated as well as sufficient phosphorus as stipulated above.

PREPARATION I

Neutral phosphate

The neutral phosphate disclosed in this specification and utilized in the following pharmaceutical formulations is prepared by intimately admixing four parts by weight of disodium hydrogen phosphate ($Na_2HPO_4$) and 1.14 parts by weight of potassium dihydrogen phosphate ($KH_2PO_4$).

PHARMACEUTICAL FORMULATIONS AND MANNER OF USING SAME

Example 1.—Tablets

The substances listed in each of the following formulations are mixed with each other and pressed into a tablet. Other binders or excipients such as magnesium stearate, edible gum, and the like may be added.

Daily dose for mammals of about 70 kilograms weight is four tablets a day.

(A)

Betamethasone (9α-fluoro-16β-methyl-1,4-pregnadiene-11β,17α,21-triol-3,20-dione)—0.15 mg.
Neutral phosphate—900 mg.
Lactose to—1 gm.

(B)

Betamethasone—0.3 mg.
Neutral phosphate—900 mg.
Lactose to 1 gm.

(C)

Betamethasone—0.3 mg.
Neutral phosphate—1.8 gm.
Lactose to—2 gm.

(D)

Betamethasone—0.6 mg.
Neutral phosphate—900 mg.
Lactose to—1 gm.

(E)

Prednisolone (1,4-pregnadien-11β,17α,21-triol-3,20-dione)—1.5 mg.
Neutral phosphate—900 mg.
Lactose to—1 gm.

(F)

Prednisolone—3 mg.
Neutral phosphate—900 mg.
Lactose to—1 gm.

(G)

Paramethasone (6α-fluoro-16α-methyl-1,4-pregnadiene-11β,17α,21-triol-3,20-dione)—0.5 mg.
Neutral phosphate—900 mg.
Lactose to—1 gm.

(H)

Prednisolone—1.5 mg.
Fructose-1,6-diphosphate-disodium salt—700 mg.
Lactose to—11 gm.

(I)

Prednisolone—2.5 mg.
Fructose-1,6-diphosphate-disodium salt—700 mg.
Lactose to—1 gm.

(J)

Betamethasone—0.15 mg.
Frustose-1,6-diphosphate-disodium salt—900 mg.
Lactose to—1 gm.

(K)

Betamethasone—0.3 mg.
Fructose-1,6-diphosphate-disodium salt—900 mg.
Lactose to—1 gm.

(L)

Hydrocortisone (4-pregnene-11β-,17α,21-triol-3,20-dione)—5 mg.
Neutral phosphate—900 mg.
Lactose to—1 gm.

(M)

Dexamethasone—0.2 mg.
Neutral phosphate—900 mg.
Lactose to—1 gm.

(N)

Betamethasone—0.15 mg.
Dipotassium pyrophosphate—450 mg.
Tetrasodium pyrophosphate—450 mg.
Lactose to—1 gm.

(O)

Betamethasone—0.3 mg.
Dipotassium pyrophosphate—450 mg.
Tetrasodium pyrophosphate—450 mg.
Lactose to—1 gm.

(P)

Flumethasone (6α,9α-difluoro-16α-methyl-1,4-pregnadiene-11β,17α,21-triol-3,20-dione)—0.5 mg.
Neutral phosphate—1.0 gm.

(Q)

Triamcinolone (9α-fluoro-1,4-pregnadiene-11β,16α,17α, 21-tetrol-3,20-dione-16,21-diacetate)—1 mg.
Neutral phosphate—1 gm.

(R)

Betamethasone—0.3 mg.
Methyl testosterone—2.5 mg.
Neutral phosphate—900 mg.
Lactose to—1 gm.

(S)

Betamethasone—0.3 mg.
Sodium fluoride—0.1 mg.
Neutral phosphate—900 mg.
Lactose to—1 gm.

Example 2.—Effervescent powders

The ingredients in each of the formulations below are combined and mixed to give a powder in which approved soluble flavoring or colouring matters may be included. The powder before use is dissolved in a glass of water.

Dose for an approximately 70 kilogram mammal is 2 to 6 times the above formulation daily.

(A)

Betamethasone 21-phosphate disodium salt—0.3 mg.
Sodium dihydrogen phosphate—3 gm.
Sodium bicarbonate—1.2 gm.
Citric acid—0.1 gm.

(B)

Betamethasone 21-phosphate disodium salt—0.3 mg.
L-lysine—300 mg.
Vitamin AV, U.S.P. units—12,500
Riboflavine—5 mg.
Thiamine—5 mg.
Pyridoxine—1 mg.
Niacinamide—50 mg.
Vitamin B-12—2 uq.
Folic acid—0.75 mg.
Ascorbic acid—100 mg.
Calcium pantothenate—10 mg.
L-methionine—300 mg.
Sodium dihydrogen phosphate—3 gm.
Sodium bicarbonate—1.2 gm.
Citric acid—0.1 gm.

Example 3.—Lozenges

Betamethasone—0.2 gm.
Neutral phosphate—100 gm.
Sucrose—25 gm.
Rose oil—.007 cc.
Gum accacia—7 gm.

Mix and make to a paste in water. Divide into 100 lozenges and dry. Dose for an approximately 70 kilogram mammal is 3 or more times daily.

Example 4.—Parenteral solution

Betamethasone acetate—1.5 mg.
Betamethasone 21 phosphate disodium salt—1.5 mg.
Ethylenediamine tetra-acetic acid disodium salt—0.1 mg.
Benzalkonium chloride—0.2 mg.
Neutral phosphate—2.5 gm.
Water to—10 cc.

Dose for an approximately 70 kilogram mammal is 4 cc. once or twice a day.

Example 5.—Syrup

Betamethasone 21-phosphate disodium salt—3 mg.
Fructose-1,6-diphosphate sodium salt—25 gm.
Glycyrrhiza syrup—50 cc.
Water to—100 cc.

Benzolkonium chloride or benzoate of soda may be added to retard spoilage.

Dose is 10 cc. orally two or more times a day for an approximately 70 kilogram mammal.

I claim:

1. A method of preventing corticosteroid-induced adverse effects on bone metabolism which comprises administering via the oral or parenteral route to an animal being treated with a therapeutic, anti-inflammatorily effective dose of a corticosteroid, substantially simultaneously with said corticosteroid, a non-toxic, assimilable, phosphorus-containing substance in an amount sufficient to provide a daily dose of at least approximately 1.4 mg. inorganic phosphorus per kilogram body weight of said animal and up to approximately 71.5 mg. inorganic phosphorus per kilogram body weight of said animal.

2. The method of claim 1 wherein said phosphorus-containing substance is a phosphate-containing substance.

3. The method of claim 1 wherein said phosphorus-containing substance is neutral phosphate, said neutral phosphates being a neutral mixture comprising four parts by weight of disodium hydrogen phosphate and 1.14 parts by weight of potassium dihydrogen phosphate.

4. The method of claim 1 wherein said phosphorus-containing substance is neutral phosphate and wherein the daily dose of said neutral phosphate is sufficient to provide from at least approximately 2.8 mg. up to approximately 71.5 mg. inorganic phosphorus per kilogram body weight of said animal, said neutral phosphate being a neutral mixture comprising four parts by weight of disodium hydrogen phosphate and 1.14 parts by weight of potassium dihydrogen phosphate.

5. The method of claim 1 wherein said phosphorus-containing substance is neutral phosphate, and wherein said corticosteroid and said neutral phosphate are administered orally, and wherein the daily dose of said neutral phosphate is sufficient to provide from at least approximately 10.7 milligrams up to approximately 36 milligrams of inorganic phosphorus per kilogram body weight of said animal, said neutral phosphate being a neutral mixture comprising four parts by weight of disodium hydrogen phosphate and 1.14 parts by weight of potassium dihydrogen phosphate.

6. The method of claim 1 wherein said animal is man, wherein said phosphorus-containing substance is neutral phosphate in amounts sufficient to provide a daily dose of from at least approximately 750 milligrams up to approximately 2.5 grams of inorganic phosphorus, and wherein said neutral phosphate and said corticosteroid are administered orally, said neutral phosphate being a neutral mixture comprising four parts by weight of disodium hydrogen phosphate and 1.14 parts by weight of potassium dihydrogen phosphate.

7. A pharmaceutical composition for oral administration consisting essentially of a corticosteroid and a non-toxic, assimilable phosphate-containing substance wherein, for a therapeutically effective anti-inflammatory unit dose of said corticosteroid, there is sufficient phosphate-containing substance to provide from at least approximately 100 milligrams up to approximately 5 grams of inorganic phosphorus.

8. A pharmaceutical composition according to claim 7 wherein said non-toxic, assimilable phosphate-containing substance is neutral phosphate, said neutral phosphate being a neutral mixture comprising four parts by weight of disodium hydrogen phosphate and 1.14 parts by weight of potassium dihydrogen phosphate.

9. A pharmaceutical composition according to claim 7 wherein said non-toxic, assimilable phosphate-containing substance is neutral phosphate, said neutral phosphate being present in amounts sufficient to provide from at least approximately 200 milligrams up to approximately 5 grams of inorganic phosphorus, said neutral phosphate being a neutral mixture comprising four parts by weight of disodium hydrogen phosphate and 1.14 parts by weight of potassium dihydrogen phosphate.

10. A pharmaceutical composition according to claim 7 for oral administration to man wherein said non-toxic, assimilable phosphate-containing substance is neutral phosphate, said neutral phosphate being present in amounts sufficient to provide from at least approximately 750 milligrams up to approximately 2.5 grams of inorganic phosphorus, said neutral phosphate being a neutral mixture comprising four parts by weight of disodium hydrogen phosphate and 1.14 parts by weight of potassium dihydrogen phosphate.

References Cited

UNITED STATES PATENTS

| | | | | |
|---|---|---|---|---|
| 3,067,098 | 12/1962 | Pool | 424— | 240 |
| 3,075,880 | 1/1963 | Roth | 424— | 128 |

SAM ROSEN, Primary Examiner

U.S. Cl. X.R.

424—224, 240

PO-1050
(5/69)

UNITED STATES PATENT OFFICE
CERTIFICATE OF CORRECTION

Patent No. 3,639,585        Dated February 1, 1972

Inventor(s) Robert H. Hesse

It is certified that error appears in the above-identified patent and that said Letters Patent are hereby corrected as shown below:

Column 1, line 32, "chorticosteroid" should read --corticosteroid--.
Column 4, line 23, "is a mammal" should read --in a mammal--.
Column 6, line 1, "doses" should read --dose--;
Column 6, lines 32 and 33, "corticostreoid" should read --corticosteroid--;
Column 6, lines 58 and 59, "subjected to" should read --subject to--.
Column 8, line 39, "Lactose to—11 gm." should read --Lactose to—1 gm.--;
Column 8, line 46, "Frustose" should read --Fructose--.
Column 9, line 33, "Vitamin AV" should read --Vitamin A--.
Column 10, line 19, claim 3, "phosphates" should read --phosphate--.

Signed and sealed this 20th day of June 1972.

(SEAL)
Attest:

EDWARD M. FLETCHER, JR.
Attesting Officer

ROBERT GOTTSCHALK
Commissioner of Patents